United States Patent [19]

Monticelli, Jr.

[11] Patent Number: 5,057,292

[45] Date of Patent: Oct. 15, 1991

[54] HYDROGEN SULFIDE ABATING COOLING TONER

[76] Inventor: Frank R. Monticelli, Jr., 1334 Wright St., Santa Rosa, Calif. 95404

[21] Appl. No.: 446,972

[22] Filed: Dec. 6, 1989

[51] Int. Cl.$^5$ .............................................. C01B 17/05
[52] U.S. Cl. ................................. 423/226; 423/576.6; 423/DIG. 19
[58] Field of Search ............ 423/226, 576.6, DIG. 19; 210/763

[56] References Cited

U.S. PATENT DOCUMENTS

| | | | |
|---|---|---|---|
| 4,076,621 | 2/1978 | Hardison | 210/758 |
| 4,091,073 | 5/1978 | Winkler | 423/226 |
| 4,363,215 | 12/1982 | Sharp | 210/763 |
| 4,414,817 | 11/1983 | Jernigan | 423/226 |
| 4,451,442 | 5/1984 | Jeffrey et al. | 423/DIG. 19 |
| 4,468,929 | 9/1984 | Jernigan | 423/DIG. 19 |
| 4,528,817 | 7/1985 | Jernigan | 423/226 |
| 4,614,644 | 9/1986 | Lampton, Jr. et al. | 423/226 |
| 4,784,775 | 11/1988 | Hardison | 210/763 |

Primary Examiner—Michael L. Lewis
Assistant Examiner—Brian M. Bolam
Attorney, Agent, or Firm—Fliesler, Dubb, Meyer & Lovejoy

[57] ABSTRACT

Hydrogen sulfide is removed from a fluid stream of condensed steam by addition of an iron chelate catalyst to oxidize $H_2S$ to sulfur. The removal is carried out in a modified cooling tower where condensed steam is added to a recycled iron chelate liquid in a water collection tray for a period of time sufficient to oxidize the $H_2S$ before the fluid stream is introduced to the cooling tower to remove sulfur.

8 Claims, 2 Drawing Sheets

HYDROGEN SULFIDE ABATING COOLING TONER

DESCRIPTION

1. Technical Field

The invention relates to the removal of hydrogen sulfide from a fluid stream which contains water, usually condensed steam, in addition to the hydrogen sulfide. The removal is carried out utilizing a modified cooling tower of the nature used for cooling and evaporating geothermal waste steam.

2. Background of the Invention

Sour water, which constitutes water plus hydrogen sulfide and, at times, other impurities, is produced in a number of processes. For example, the output steam and hydrogen sulfide mixture from a turbine run on geothermal steam is conventionally condensed to form sour water. Sour water can also be formed in various industrial processes such as the hydrotreating of gasoline and fuel oil followed by washing of the gases thereby produced. Sour water can similarly be produced by hydrotreating of coal.

In the geothermal steam industry it is customary to condense the output of a turbine driven by the geothermal steam in a condenser or series of condensers, to combine a catalyst, often ferric chelate, with the condensate output of the condensers in what is generally known as a hot well and is generally at a temperature of between about 100° and 125° F. and then to deliver the water from the hot well to the top of a cooling tower, perhaps 50 feet in height, through which it flows downwardly against the upward flow of a stream of fast moving air. In the cooling tower approximately 80% of the water volume of the condensed steam is evaporated and any residual hydrogen sulfide is desorbed into the atmosphere. The remaining water, comprising approximately 20% of the volume of the condensed steam plus the volume of cooling water provided to the condenser or condensers, reaches the bottom of the tower where it flows into a tray. The overflow from the tray is discarded while part of the liquid from the tray is recycled as cooling liquid to the condenser or condensers. Such systems are described in, for example, U.S. Pat. No. 4,414,817, issued Nov. 15, 1983 to R.T. Jernigan, U.S. Pat. No. 4, 528,817, issued July 16, 1985 to R.T. Jernigan, U.S. Pat. No. 4,614,644, issued Sept. 30, 1986 to R.D. Lampton, Jr., and T.M. Hopkins II, and in U.S. Pat. No. 4,363,215, issued Dec. 14, 1982 to S.G. Sharp.

As has been noted above a portion of the cool water from the tray at the bottom of the cooling tower is discarded in liquid form. In essence, 80% of the water condensed from the turbine exhaust is evaporated in the tower while the remaining 20% must constitute the overflow for the system to operate in equilibrium. The overflow water carries with it a significant amount of the catalyst which was present in the hot well thereby leading to very significant processing costs. And, the concentration of ferric chelate or other catalyst, e.g., a polyvalent cobalt, manganese, tin, vanadium, platinum, palladium molybdenum, chromium, copper or nickel chelate, in the hot well must be relatively high to assure reasonably complete conversion of hydrogen sulfide to sulfur because the time of retention of the condensed sour water in the hot well and associated piping connecting it to the top of the cooling tower is very short, of the order of 30 seconds or less, and usually in the range of from about 5 to about 15 seconds. The kinetics of the reactions whereby the hydrogen sulfide is oxidized with the concomitant reduction of the ferric chelate to ferrous chelate and the catalyst is regenerated to the ferric state are such that if the oxidation reaction is to go reasonably towards completion it is necessary, as previously stated, that a relatively high concentration of ferric chelate catalyst be maintained.

The present invention is directed to overcoming one or more of the problems as set forth above.

DISCLOSURE OF INVENTION

In accordance with an embodiment of the present invention an improvement is set forth in a process for removing $H_2S$ from a condensate comprising $H_2S$ and water which comprises including with the condensate a catalyst in an amount sufficient to catalyze the oxidation of the $H_2S$ to sulfur, introducing the condensate to the top portion of the cooling tower from which it flows downwardly against an upward flow of air whereby it is cooled and oxygenated and a portion of the condensate is evaporated to form a recycle liquid, collecting the recycle liquid in a water collection tray, discarding a portion of the recycle liquid corresponding generally to the non-evaporated portion of the condensate and recycling the remainder of the catalyst containing recycle liquid back to the condenser. The improvement comprises carrying out the introducing step by adding the condensate to the recycle liquid in the water collection tray at a first region thereof to form a recycle liquid-condensate mixture. A portion of the mixture is removed from a second region of the water collection tray. The second region is spaced apart from the first region a selected distance. The thus removed portion of the mixture is introduced to the top of the cooling tower whereby the condensate is thereby introduced to the top of the tower along with a proportionate amount of the recycle liquid.

In accordance with another embodiment of the present invention an improvement is set forth in a process for removing $H_2S$ from a fluid stream having steam as its major component which comprises condensing the steam to form a condensate, including a catalyst with the condensate in an amount sufficient to catalyze the oxidation of the $H_2S$ to sulfur, introducing the condensate to the top portion of a cooling tower from which it flows downwardly against an upward flow of air whereby it is cooled and oxygenated and a portion of the condensate is evaporated to form a recycle liquid, collecting the recycle liquid in a water collection tray, discarding a portion of the recycle liquid corresponding generally in volume to the non-evaporated portion of the condensate and recycling the remainder of the catalyst containing recycle liquid back to the condenser. The improvement comprises carrying out the introducing step by adding the condensate to the recycle liquid in the water collection tray at a first region thereof to form a recycle liquid-condensate mixture A portion of the mixture is removed from a second region of the water collection tray. The second region is spaced apart from the first region a selected difference. The thus removed portion of the mixture is introduced to the top of the cooling tower whereby the condensate is introduced to the top of the cooling tower along with a proportionate amount of the recycle liquid.

The present invention allows use of much lower quantities, generally no more than about one half the amount, of catalyst, generally iron chelate, to equally well remove a given quantity of $H_2S$ from a fluid stream. This is accomplished by, in essence, greatly increasing the reaction time available for the oxidation of the $H_2S$ to sulfur and by increasing the available oxygen in solution to bring this about. This time is greatly increased by taking the condensate and introducing it to the tray at the bottom of the cooling tower and then removing the mixture of the recycle liquid in the tray plus the added condensate from a different location in the tray and introducing that mixture to the top of the cooling tower. The added reaction time is the time it takes the condensate to flow from the region where it is introduced into the cooling tower collecting tray to the region from which it is abstracted. Cooling tower water collecting trays are far bigger than the hot wells of condensers (a typical hot well and associated piping might have a volume of 10,000 gallons while a typical cooling tower collecting tray might have a volume of 250,000 gallons). Much longer residence times are available and possible in the cooling tray than are available and possible in the hot well since approximately the same rate of liquid flow occurs through both. Thus, time in the cooling tray will generally be at least one minute, and can easily be made to be several minutes in length. The result is the use of far less catalyst, generally iron chelate, in the process with very significant monetary savings.

BRIEF DESCRIPTION OF THE DRAWINGS

The invention will be better understood by reference to the figures of the drawings wherein like numerals denote like parts throughout and wherein.

BEST MODE FOR CARRYING OUT INVENTION

Figure 1:
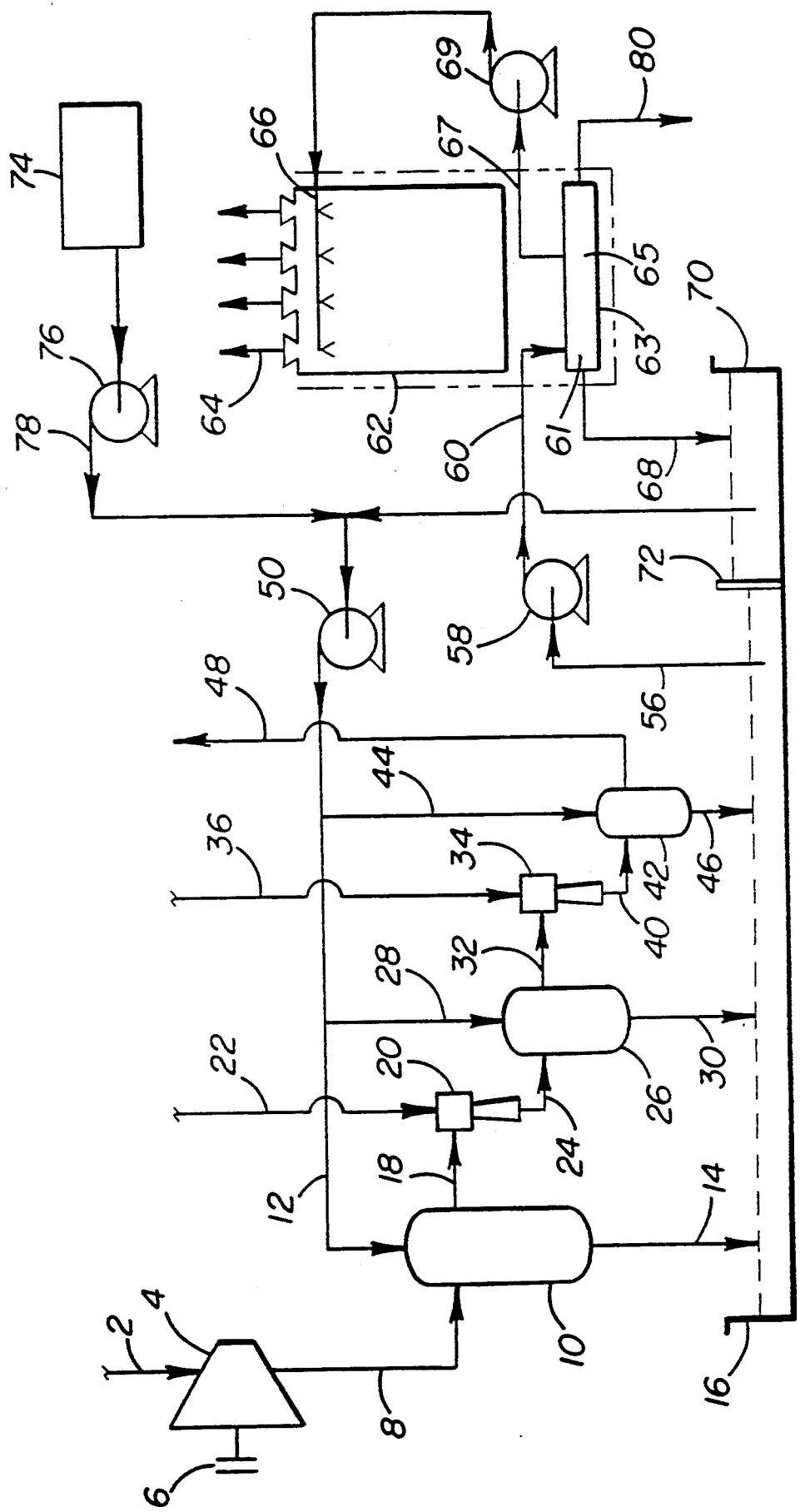
FIG. 1 illustrates a process for purifying geothermal steam in accordance with the present invention.

FIG. 1 illustrates a process in which the invention is applied for the oxidation of hydrogen sulfide contained in a liquid stream produced by the condensation of geothermal steam. A similar application can be made to streams resulting from other industrial processes.

In FIG. 1 the geothermal steam from line 2 is used to power a steam turbine 4 which is connected to an electric power generator 6. The turbine 4 exhausts through line 8 to a direct contact condenser 10. Cooling water containing chelated iron (ferric chelate), or other appropriate catalyst, from line 12 is sprayed into condenser 10 for this condensation and passes from the condenser 10 through line 14 to the hot well 16 operating at, usually, 100°–125° F. Non-condensible gases such as $CO_2$, $H_2$, $CH_4$, $N_2$ and $H_2S$, along with atmospheric gases which can leak into the condenser 10, are removed from the main condenser 10 through the line 18 by two steam jet ejectors 20 and 34 and the associated condensers 26 and 42. The ejectors 20 and 34 are operated by steam supplied by lines 22 and 36, respectively. These ejectors create a partial vacuum or low pressure zone. The exhaust flow stream from the ejector 20 is carried by line 24 to the condenser 26 and by line 32 to the second ejector 34. The exhaust steam from ejector 34 is carried by line 40 to condenser 42. Cooling water from line 12 is supplied to each of the condensers 26 and 42 by lines 28 and 44, respectively. The condensed steam from the condensers 26 and 42 flows by means of line 30 and 46 to the hot well 16. The hydrogen sulfide component of the non-condensible gases can be scrubbed by addition of caustic to the quench water supply to the condenser 42 or the condenser off-gas vented to a conventional incinerator/scrubber unit through line 48 for removal of the $H_2S$ gases.

Pump 58 is used to pump the combined thermal steam and cooling water from hot well 16 through line 60, and in accordance with the invention, to a first region 61 in collecting tray 63 located at the base of the cooling tower 62. Also in accordance with the invention a portion of the mixture of condensate and recycle liquid in the collecting tray 63 is pumped from a second region 65 in the collecting tray 63, the second region 65 being spaced apart a selected distance from the first region 61, via a conduit 67 and under the impetus of a pump 69 to internal spray heads 66 in the top portion of the cooling tower 62. An amount of water equal to approximately 80% of the condensed steam is evaporated by air flow through the tower which also strips all of the dissolved hydrogen sulfide from the liquid whereby it would be vented to the environment by means of the air stream 64 if it had not already been converted to sulfur by use of the chelated iron. The excess condensed steam which is not evaporated overflows the collection tray 63 for disposal by line 80. The remainder of the cooled recycle liquid-condensate mixture flows through line 68 to the relatively cold well 70 which operates at 75°–85° F. Pump 50 is used to pump the recycle liquid-condensate mixture from the cold well 70 to the condensers 42, 26 and 10. In the embodiment illustrated the hot well 16 is separated from the cold well 70 by a weir 72.

In order to prevent the release of the dissolved hydrogen sulfide to the environment in the air stream 64 flowing from the top of the cooling tower 62, a catalyst, often ferric chelate, is added to the circulating water in an amount sufficient to catalyze the oxidation of most of the dissolved hydrogen sulfide in the hot well 16 and in the collecting tray 63. The iron chelate is concurrently oxidized from the ferrous to the ferric state by any dissolved oxygen. In this manner, the dissolved hydrogen sulfide is oxidized before the water enters the top of the cooling tower 62 from the conduit 67. The air flow and time of contact between the air and water in the cooling tower 62 is sufficiently long so that the ferrous chelate, which results from the oxidation of the dissolved hydrogen sulfide in the hot well 16 and in the collecting tray 63 and also in associated piping 56, 60 and 67, is reoxidized fully to the active ferric state as it passes down through the cooling tower 62. Concurrently, the water is oxygenated. Elemental sulfur produced by the process may be eliminated by conventional means from the overflow line 80.

In order to maintain at least the minimum amount of iron chelate required for this process, an amount of fresh iron chelate equal to the amount lost in the overflow line 80 and that amount of iron lost to formation of insoluble iron compounds in the solution is added from the storage vessel 74 by pump 76 and inlet line 78. It should be noted that the point of addition of the additional iron chelate to the circulating water is a matter of design choice. That is, it is not necessary that it be added at the particular location shown. Instead, it can be added, for example, to the hot well 16, the cold well 70 or the collecting tray 63. Thus, the ferric chelate may be included with the condensate by adding it substantially anywhere in the water flow cycle. To minimize loss of iron to overflow and loss by solids formation (especially when caustic scrubbing occurs in the after condenser 42) it works well to add the iron chelate where illustrated in FIG. 1.

In accordance with the present invention the selected distance between the first region 61 and the second region 65 in the collecting tray 63 is selected to provide sufficient residence time of the recycle liquid-condensate mixture in the water collection tray 63 so that the oxidation of the H$_2$S is carried out substantially to completion. This reaction is facilitated by the oxygen rich water which falls through the cooling tower 62. Generally the residence time will be selected to be at least about one minute. The overall effect of utilizing a process as set forth herein is that the concentration of ferric chelate which is included in the condensate is reduced by at least a factor of two and suitably by a factor of five or more. The current cost for iron chelate and associated H$_2$S abatement chemicals for the production of about 350 megawatts at a portion of the geyser fields in the Geyserville area of Northern California is of the order of Ten Million Dollars per year. Thus, a very significant saving results from operation in accordance with the present invention.

Figure 2:
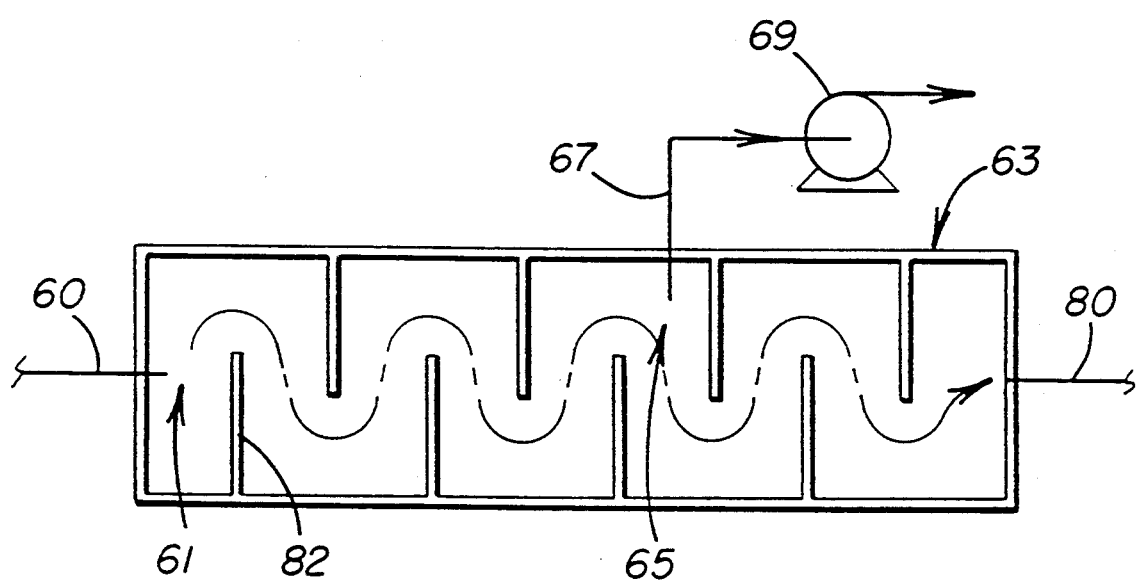
FIG. 2 illustrates the portion of the process taking place in the cooling tower collecting tray.

Referring principally to FIG. 2 an embodiment of the invention is illustrated wherein flow through the cooling tray 63 is controlled so that recycle liquid-condensate mixture which is extracted from the second region 65 of the tray 63 is of a somewhat more uniform composition. Flow of the mixture takes place from the first region 61 of the tray 63, where the condensate is introduced to the collecting tray 63, rightwardly as directed by a plurality of walls 82 till the flow finally passes out via the line 80. The second region 65 can be so located as to provide water of a desired temperature for recycling via the line 67 to the top portion of a plurality of cooling towers 62, all feeding into the same collecting tray 63. It should be noted that since the recycle liquid-condensate mixture is at a somewhat cooler temperature than the condensate alone, the temperature of the mixture introduced to the top portion of the cooling tower 62 is somewhat lowered over that which was introduced by the prior art. The temperature of the cooling water in the cooling tower tray 63 will also be somewhat warmer at the outlet 80. Both depend on the proximity of line 60 to conduit 67. Accordingly, somewhat less water will be evaporated in the cooling tower 62. If desired, the cooling tower 62 can be increased in size whereby just as much water can be evaporated as is currently evaporated.

The terms ferric chelate, ferrous chelate and iron chelate are used in the usual sense with respect to the removal of H$_2$S from sour gases and sour water. A conventional removal process which utilizes iron chelate is shown in for example U.S. Pat. Nos. 4,091,073 and 4,076,621. Basically the present invention contemplates the use of any chelated iron solution or other suitable polyvalent metal catalyst having both a higher and a lower oxidation state and which is operable for removing hydrogen sulfide. It is also possible to use two different types of chelating agents, one of which is selected to bind ferrous ions strongly enough to prevent precipitation of ferrous sulfide and the other of which is selected to bind ferric ions strongly enough to prevent precipitation of ferric hydroxide. Such chelating agents are available commercially for use in converting H$_2$S to sulfur.

Industrial Applicability

The present invention provides processes for removing H$_2$S from a fluid stream having steam as its major component, which fluid stream may be obtained from a steam turbine which is powered by steam from a geothermal well. The amount of chelated iron needed to participate in the oxidation-reduction reaction which cyclically produces sulfur from hydrogen sulfide is significantly reduced when operating in accordance with the present invention. As a result, the total amount of iron chelate utilized in the process is significantly less than that utilized in prior art processes for removing H$_2$S from a fluid stream having steam as its major component.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. In a process for removing H$_2$S from a condensate comprising H$_2$S and water which comprises including with the condensate a catalyst in an amount sufficient to oxidize the H$_2$S to sulfur, introducing the condensate to the top portion of a cooling tower from which it flows downwardly against an upward flow of air whereby it is cooled and oxygenated and a portion of the condensate is evaporated to form a recycle liquid, collecting the recycle liquid in a water collection tray, discarding a portion of the recycle liquid corresponding generally to the non-evaporated portion of the condensate and recycling the remainder of the catalyst containing recycle liquid back to the condensate, an improvement comprising, carrying out said introducing step by:

adding the condensate to the recycle liquid in the water collection tray at first region thereof to form a recycle liquid-condensate mixture;

removing a portion of the mixture from a second region of the water collection try, said second region being spaced apart from said first region a distance selected to provide sufficient residence time of the mixture in the water collection try for the oxidation of the H$_2$S to be carried substantially to completion; and introducing the thus removed portion of the mixture to the top of the cooling tower whereby the condensate is thereby introduced to the top of the tower along with a proportionate amount of the recycle liquid.

2. A process as set forth in claim 1, wherein said residence time is at least about 1 minute.

3. A process as set forth in claim 1, wherein the amount of catalyst which is included in the condensate is reduced by at least a factor of 2 from that amount which is needed for the oxidation of the H$_2$S to be substantially completed if the condensate is introduced directly to the top portion of the cooling tower.

4. A process as set forth in claim 1, wherein the catalyst has a higher oxidation state and a lower oxidation state, wherein the catalyst is in its higher oxidation state when included with the condensate, is reduced to its lower oxidation state during oxidation of the H₂S to sulfur while concurrently being oxidized to its higher oxidation state by oxygen dissolved in the condensate and is oxidized to its higher oxidation state as the condensate flows downwardly through the cooling tower.

5. In a process for removing H₂S from a fluid stream having steam as its major component which comprises condensing the steam to form a condensate, including a catalyst with the condensate in an amount sufficient to oxidize the H₂S to sulfur, introducing the condensate to the top portion of a cooling tower from which it flows downwardly against an upward flow of air whereby it is cooled and oxygenated and a portion of the condensate is evaporated to form a recycle liquid, collecting the recycle liquid in a water collection tray, discarding a portion of the recycle liquid corresponding generally to the non-evaporated portion of the condensate and recycling the remainder of the catalyst containing recycle liquid back to the condensate, an improvement comprising, carrying out said introducing step by:

adding the condensate to the recycle liquid in the water collection tray at a first region thereof to form a recycle liquid-condensate mixture;

removing a portion of the mixture from a second region of the water collection tray, said second region being spaced apart from said first region a distance selected to provide sufficient residence time of the mixture in the water collection try for the oxidation of the H₂S to be carried substantially to completion; and introducing the thus removed portion of the mixture to the top of the cooling tower whereby the condensate is thereby introduced to the top of the tower along with a proportionate amount of the recycle liquid.

6. A process as set forth in claim 5, wherein said residence time is at least about 1 minute.

7. A process as set forth in claim 5, wherein the amount of catalyst which is concluded in the condensate is reduced by at least a factor of 2 from that amount which is needed for the oxidation of the H₂S to be substantially completed if the condensate is introduced directly to the top portion of the cooling tower.

8. A process as set forth in claim 5, wherein the catalyst has a higher oxidation state and a lower oxidation state, wherein the catalyst is in its higher oxidation state when included with the condensate, is reduced to its lower oxidation state during oxidation of the H₂S to sulfur while concurrently being oxidized to its higher oxidation state by oxygen dissolved in the condensate and is oxidized to its higher oxidation state as the condensate flows downwardly through the cooling tower.

* * * * *